United States Patent [19]
Satomi

[11] Patent Number: 5,438,227
[45] Date of Patent: Aug. 1, 1995

[54] LINEAR PULSE MOTOR

[75] Inventor: Hirobumi Satomi, Kashiwa, Japan

[73] Assignee: Oriental Motor Co., Ltd., Tokyo, Japan

[21] Appl. No.: 170,739

[22] Filed: Dec. 21, 1993

[30] Foreign Application Priority Data

Dec. 21, 1992 [JP] Japan .................... 4-340280

[51] Int. Cl.6 .................................. H02K 41/02
[52] U.S. Cl. ............................. 310/14; 310/12
[58] Field of Search ............................ 310/12, 14

[56] References Cited

U.S. PATENT DOCUMENTS 5,341,054 8/1994 Tal et al. ............................ 310/14

FOREIGN PATENT DOCUMENTS

| 58-75458 | 5/1983 | Japan | 310/12 |
| 61-180564 | 8/1986 | Japan | 310/12 |
| 1396214 | 5/1988 | U.S.S.R. | 310/12 |

Primary Examiner—Thomas M. Dougherty
Assistant Examiner—Judson H. Jones
Attorney, Agent, or Firm—Jacobson, Price, Holman & Stern

[57] ABSTRACT

A linear pulse motor of the present invention comprises a stator core 10 having salient poles with teeth in the axial direction on the inner peripheral surface, stator windings W2 and W4 wound around each salient pole, and a mover which can move freely in the axial direction in the stator. The mover includes magnetic pole blocks 22 and 34 having teeth in the axial direction on the outer peripheral surface thereof and a permanent magnet 40 magnetized to a predetermined polarity. The aforesaid two magnetic pole blocks are arranged in an opposed relationship with respect to each salient pole via a circumferential gap. The magnetic pole block is magnetized to different polarity from each other by the permanent magnet disposed in the mover core. When the tooth tops of one magnetic pole block are opposed to the tooth tops of the salient pole, the tooth tops of the other magnetic pole block are opposed to the tooth bottoms of the salient pole. In the linear pulse motor of the present invention, the ampere-conductors can be increased, the magnetic circuit is uniform, multiple phases can be provided without increasing the length in the axial direction, and the length of mover in the axial direction can be made shorter than that of the stator.

15 Claims, 9 Drawing Sheets

LINEAR PULSE MOTOR

FIELD OF THE INVENTION AND RELATED ART STATEMENT

The present invention relates to a linear pulse motor.

Figure 14:
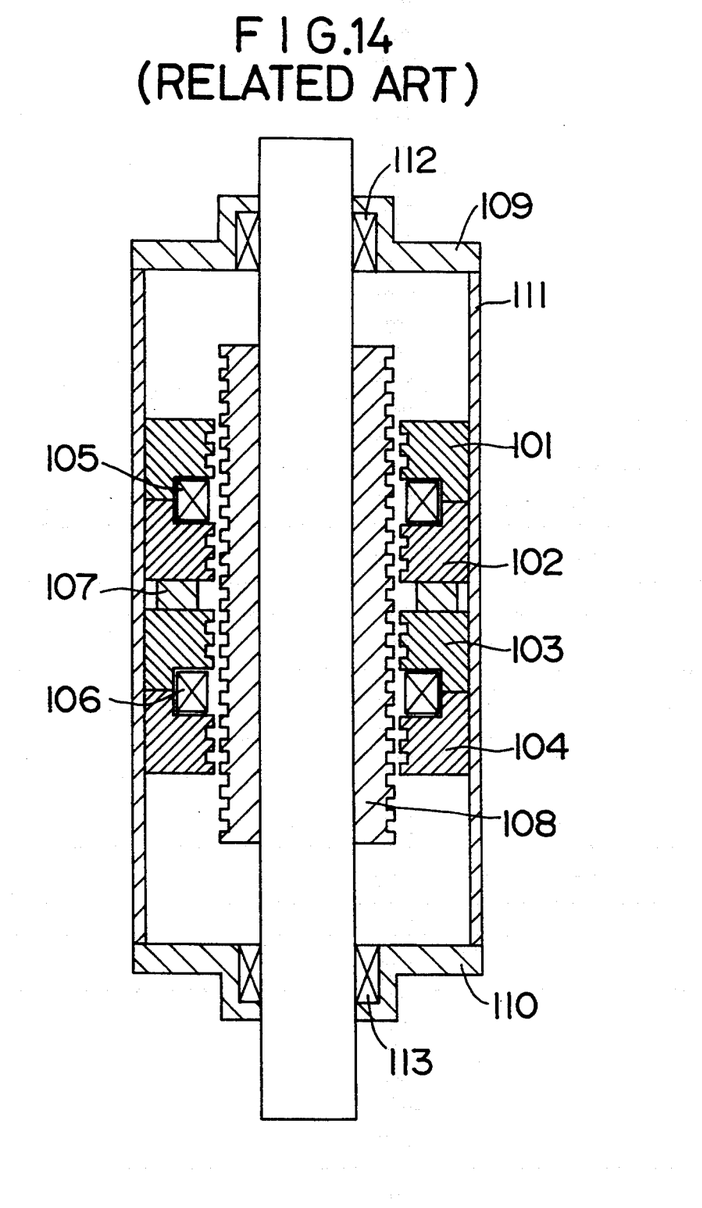
FIG. 14 is a longitudinal sectional view of a cylinder type linear pulse motor which relates to the present invention.

FIG. 14 is a longitudinal sectional view of a cylinder type linear pulse motor relating to the present invention.

In FIG. 14, stator cores 101, 102, 103, and 104 are of a stepped ring shape whose outer peripheral edge is thicker in the thickness direction. A plurality of stator teeth are disposed at equal pitches in the axial direction. These stator cores 101, 102, 103, and 104 are supported and encased by a frame 111.

A ring-shaped groove is formed by combining the stator cores 101 and 102 with their outer peripheral edges being butted against each other. In this ring-shaped groove, a ring-shaped winding 105 is disposed in a grasped manner. Likewise, in a ring-shaped groove formed between the stator cores 103 and 104, a ring-shaped winding 106 is disposed in a grasped manner.

In this cylinder type linear pulse motor, the stator cores 101 and 102 and the ring-shaped winding 105 constitutes one phase, while the stator cores 103 and 104 and the ring-shaped winding 106 constitutes the other phase; a total of two phases are constituted.

A ring-shaped permanent magnet 107 is put between the stators forming the aforesaid two phases, and is polarized in the axial direction.

A mover core 108 is cylindrical. On its outer peripheral surface, a plurality of mover teeth are disposed at the equal pitch in the axial direction. The mover is supported by brackets 109 and 110 via bearings 112 and 113.

The aforesaid stator teeth and mover teeth are in the following positional relationship: When the stator teeth disposed on the stator core 104 is just facing the mover teeth, the stator teeth disposed on the stator core 103 shifts by 2/4 of the tooth pitch in the axial direction with respect to the stator core 104. The stator teeth disposed on the stator core 102 shifts by ¼ of the tooth pitch in the axial direction with respect to the stator core 104. Further, the stator teeth disposed on the stator core 101 shifts by ¾ of the tooth pitch in the axial direction with respect to the stator core 104.

With such a constitution, the cylinder type linear pulse motor constitutes a two-phase hybrid type linear pulse motor.

In the cylinder type linear pulse motor of the above construction, however, the winding housing portion cannot be made large, so that the ampere-conductors per phase cannot be increased. Therefore, the linear pulse motor of this type is disadvantageous in that the driving force is low. Also, it is dis-advantageous in that the magnetic circuit is nonuniform, so that there is a difference in driving force between the energized phases, because the stator cores 101 and 104 are located at positions more distant from the permanent magnet 107 than the stator cores 102 and 103. Further, there is a problem in that the length of the motor in the axial direction is increased because the phases are arranged, in principle, in the axial direction. Still further, there is a disadvantage that the motor casing is required because the permanent magnet lies on the stator side, and the length of mover in the axial direction must be larger than the length of stator in the axial direction, so that the inertia of mover is increased.

OBJECT AND SUMMARY OF THE INVENTION

The present invention was made in view of the above situation. Accordingly, an object of the present invention is to provide a linear pulse motor in which ampere-conductors per phase can be increased, the magnetic circuit is uniform, and multiple phases can be provided.

Another object of the present invention is to provide a linear pulse motor in which the length of mover in the axial direction can be smaller than that of stator, and no motor casing for the stator is required.

To achieve the above objects, the linear pulse motor in accordance with the present invention has the following configurations (1) and (2):

(1) The linear pulse motor in accordance with the present invention comprises a stator including a stator core having a plurality of salient poles disposed radially on the inner side and having a plurality of teeth disposed axially on the inner peripheral surface of the salient poles and a stator winding wound around each of the salient poles; and a mover which is supported in the stator so as to move in the axial direction, wherein the mover has a plurality of teeth in the axial direction on the outer peripheral surface opposing to the inner peripheral surface of the stator and includes a mover core having a plurality of magnetic pole blocks disposed in the peripheral direction and a permanent magnet for magnetizing the magnetic pole blocks to a predetermined magnetic polarity, two of the magnetic pole blocks are disposed in an opposing relationship with respect to each of the stator salient poles with a air-gap in the peripheral direction, respective two magnetic pole blocks described above are magnetized to different polarity from each other by the permanent magnet disposed in the mover core. and when the tooth tops of one of the two magnetic pole blocks are opposed to the tooth tops of one salient pole of the stator, the tooth tops of the other magnetic pole block are opposed to the tooth bottoms of the other salient pole of the stator.

(2) The linear pulse motor in accordance with the present invention comprises a stator including a stator core having a plurality of salient poles disposed radially on the inner side and having a plurality of teeth disposed axially on the inner peripheral surface of the salient poles and a stator winding wound around each of said salient poles; and a mover which is supported in the stator so as to move in the axial direction, wherein the mover includes two mover cores having a plurality of teeth in the axial direction on the outer peripheral surface opposing to the inner peripheral surface of the stator and a permanent magnet which is put between the two mover cores and magnetized in the axial direction, the two mover cores are magnetized to different polarity from each other by the permanent magnet interposed between the mover cores, and when the tooth tops of the teeth on one core of the two mover cores are opposed to the tooth tops of a plurality of teeth disposed on one of the salient pole of the stator, the tooth bottoms of the teeth of the other mover core are opposed to the tooth tops of the stator salient pole.

The operation of the present invention is such that a multi-phase linear pulse motor can be configured without increasing the length in the axial direction. Also, since the stator winding is disposed in the peripheral direction of the stator in such a manner that the winding is wound around each salient pole, the ampere-conductors can be increased, by which a compact and high driving power linear pulse motor can be configured. Further, the construction in which the permanent magnet is disposed on the mover side makes the length of mover core in the axial direction smaller than the length of stator core in the axial direction, and eliminates the motor casing, so that the motor size can be decreased in the radial direction. Still further, since the stator core can be formed by laminating the stator iron plates each being rotated by a predetermined angle, the conventional laminated core technology for rotary stepping motors can be applied, so that the productivity is high.

As seen from the above description, according to the present invention, a multi-phase linear pulse motor can be configured without increasing the length in the axial direction. Also, since the stator winding is disposed in the peripheral direction of the stator in such a manner that the winding is wound around each salient pole, the ampere-conductors can be increased, by which a compact and high driving power linear pulse motor can be configured. Further, the construction in which the permanent magnet is disposed on the mover side makes the length of mover core in the axial direction smaller than the length of stator core in the axial direction, and eliminates the motor casing, so that the motor size can be decreased in the radial direction. Still further, since the stator core can be formed by laminating the stator iron plates each being rotated by a predetermined angle, the conventional laminated core technology for rotary stepping motors can be applied, so that the productivity is high.

BRIEF DESCRIPTION OF THE DRAWINGS

In the drawings,

FIG. 7 is a sectional view of a mover, showing another modification of the mounting construction of mover permanent magnet, in which

DETAILED DESCRIPTION OF PREFERRED EMBODIMENTS

Figure 1:
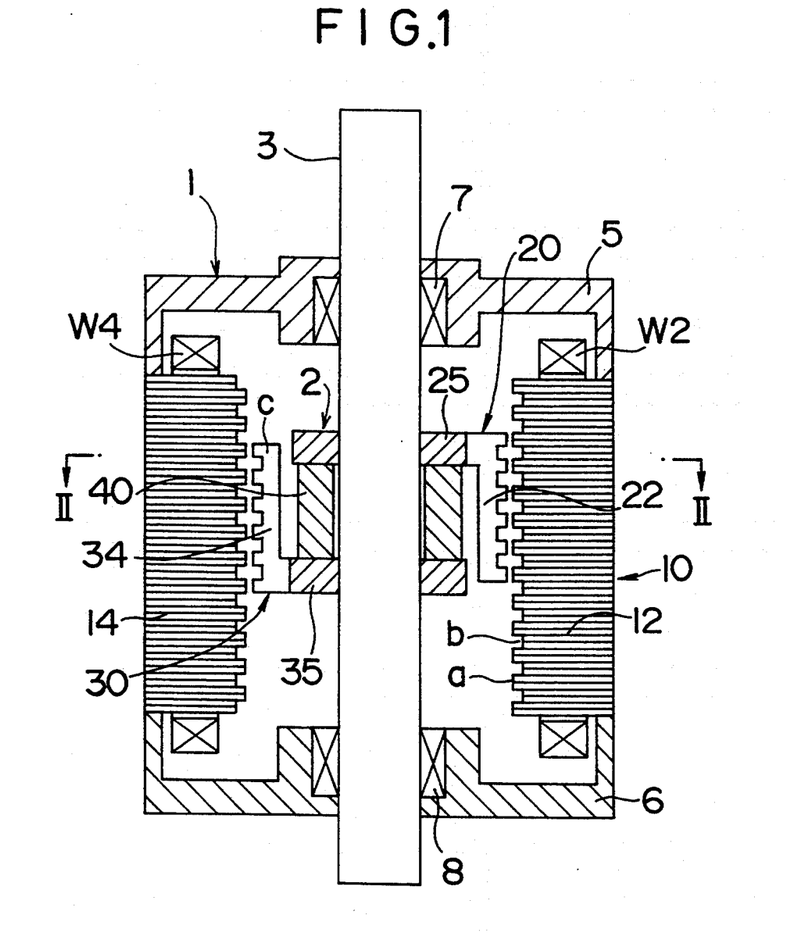
FIG. 1 is a longitudinal sectional view of the first embodiment of the linear pulse motor in accordance with the present invention.
Figure 2:
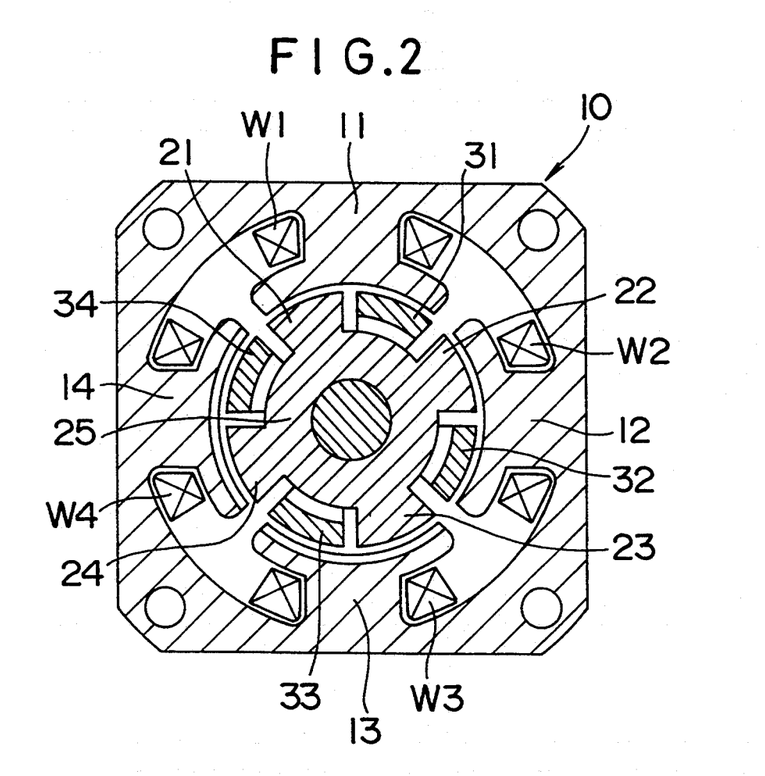
FIG. 2 is a transverse sectional view taken along the line II—II of FIG. 1.

The first embodiment of the present invention will be described in detail below with reference to FIGS. 1 through 10. FIG. 1 is a longitudinal sectional view of one embodiment of the linear pulse motor of the above-described configuration (1) in accordance with the present invention, and FIG. 2 is a transverse sectional view of the linear pulse motor taken along the line II—II of FIG. 1. In this case, the values of positive integer k and the number of phases m are k=1 and m=2, respectively; therefore, the number of stator salient poles is $2 \cdot k \cdot m = 4$.

In FIGS. 1 and 2, each of four salient poles 11, 12, 13, and 14 which are disposed on a stator core 10 is provided with a plurality of stator teeth (tooth top a and tooth bottom b) in the axial direction on the inner peripheral surface thereof. A stator winding W1, W2, W3, and W4 is separately wound around each of the four salient poles. The stator core 10 is supported by brackets 5 and 6 by fixing with screws (not shown) or the like. Therefore, neither a frame for the motor nor a motor casing is required.

On the other hand, a mover 2 located in the stator 1, together with a shaft 3 thereof, is supported by the brackets 5 and 6 via bearings 7 and 8 so that it can move in the axial direction. The mover 2 is provided with magnetic pole cores 20 and 30 and a permanent magnet 40 which is put between the magnetic pole cores 20 and 30 and magnetized in the axial direction. In the magnetic pole core 20, magnetic pole blocks 21 through 24 having teeth (tooth top c) are disposed via a disc-shaped yoke portion 25. Likewise, in the magnetic pole core 30, magnetic pole blocks 31 through 34 having teeth are disposed via a disc-shaped yoke portion 35.

Figure 3:
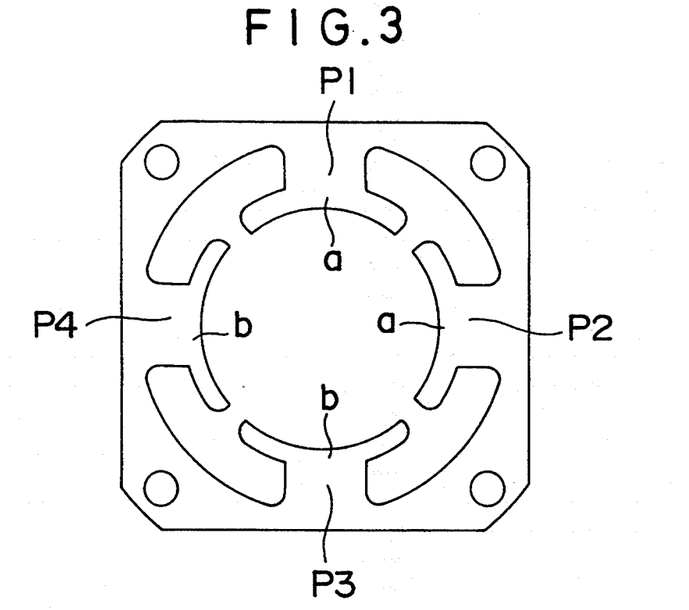
FIG. 3 is a plan view of a stator iron plate which forms a stator core.

FIG. 3 shows an example of a stator iron plate which forms the stator core 10. In FIG. 3, the salient poles P1 and P2, having a smaller inside radius dimension, constitute the tooth top a of the stator core 10, whereas the salient poles P3 and P4, having a larger inside radius dimension, constitute the tooth bottom b of the stator core 10.

Figure 4:
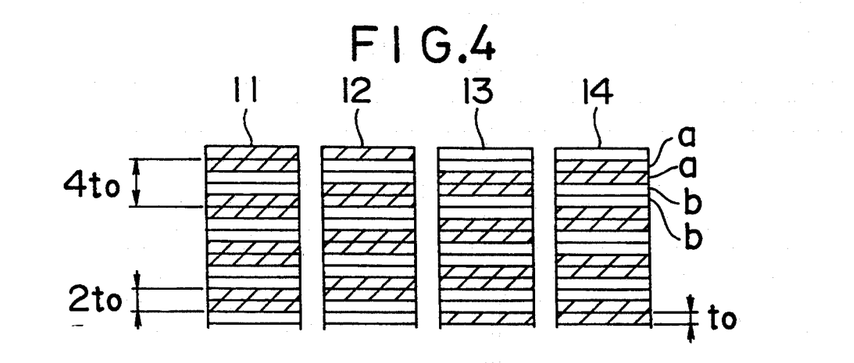
FIG. 4 is a development elevation, viewed from the mover side, of the stator tooth portion which is formed when the stator iron plates of FIG. 3 are laminated by rotating a predetermined angle each.

FIG. 4 is a development elevation, viewed from the mover 2 side, of the stator tooth portion of the salient poles 11, 12, 13, and 14 of the stator core 10, which is formed when the stator iron plates are laminated by rotating an angle of $\theta = 90°$ each. The black portion (hatched portion) indicates the tooth top a, while the white portion (non-hatched portion) indicates the tooth bottom b. If the thickness of the stator iron plate is taken as $t_0$, the teeth of a tooth pitch of $2 \cdot k \cdot m \cdot t_0$, namely, $4 \cdot t_0$ (k=1, m=2) and a tooth thickness of $m \cdot t_0$, namely, $2 \cdot t_0$ are formed on each salient pole by rotation laminating. When the salient pole 11 is taken as the reference, the teeth of the salient pole 12 shifts by $1/(2 \cdot m)$, namely, ¼ of the tooth pitch, the teeth of the salient pole 13 shifts by 2/(2·m), namely, 2/4 of the tooth pitch, and the teeth of the salient pole 14 shifts by 3/(2·m), namely, ¾ of the tooth pitch.

Figure 5:
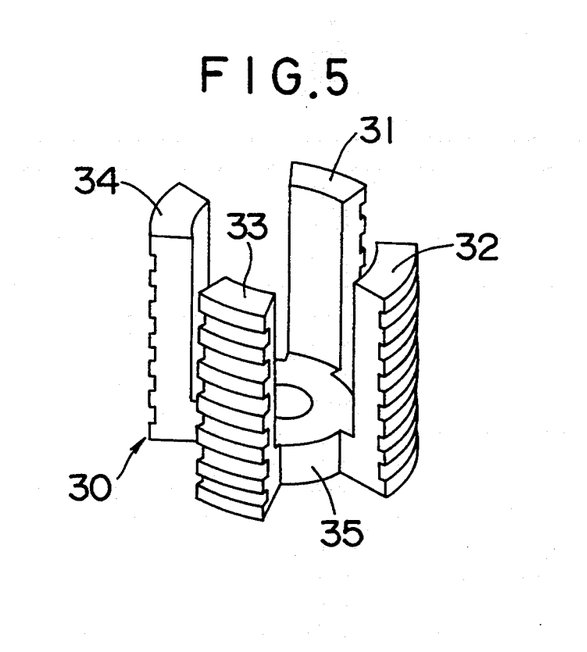
FIG. 5 is a perspective view of a magnetic pole core which forms a mover.

FIG. 5 is a perspective view of the aforesaid magnetic pole core 30. As shown in FIG. 5, in the magnetic pole core 30, the same number of magnetic pole blocks 31, 32, 33, and 34 as the number of salient poles are integrally formed via a disc-shaped yoke portion 35 at the end in the axial direction. On the outer peripheral surface of each of the magnetic pole blocks 31 through 34, a plurality of teeth are disposed so that the same positional relationship of tooth top and tooth bottom holds in the axial direction. Likewise, in the magnetic pole core 20, the magnetic pole blocks 21, 22, 23, and 24 are integrally formed via the disc-shaped yoke portion 25, and a plurality of mover teeth are disposed in the axial direction. As shown in FIGS. 1 and 2, in the aforesaid mover 2, the magnetic pole cores 20 and 30 are combined in an opposing relationship so that the aforesaid ring-shaped permanent magnet 40 is put in-between and the magnetic pole blocks of each magnetic pole core are disposed alternately along the peripheral direction. The length in the axial direction of the permanent magnet 40 disposed in the mover 2 is set such that the teeth disposed on the magnetic pole core 20 and the teeth disposed on the magnetic pole core 30 shift with each other by ½ of the tooth pitch. One phase is formed by performing wiring so that the phase around which winding W1 is wound is A phase, and the phase around which winding W3 is wound is inverse A phase (inverse phase of A), while the other phase is formed by performing wiring so that the phase around which winding W2 is wound is B phase, and the phase around which winding W4 is wound is inverse B phase (inverse phase of B).

Thus, a two-phase hybrid type linear pulse motor can be configured. In this case, the basic traveling amount for each step is 1/(2·m), of the tooth pitch namely, (4·$t_0$)/4, which is the thickness $t_0$ of the aforesaid stator iron plate.

Figure 6:
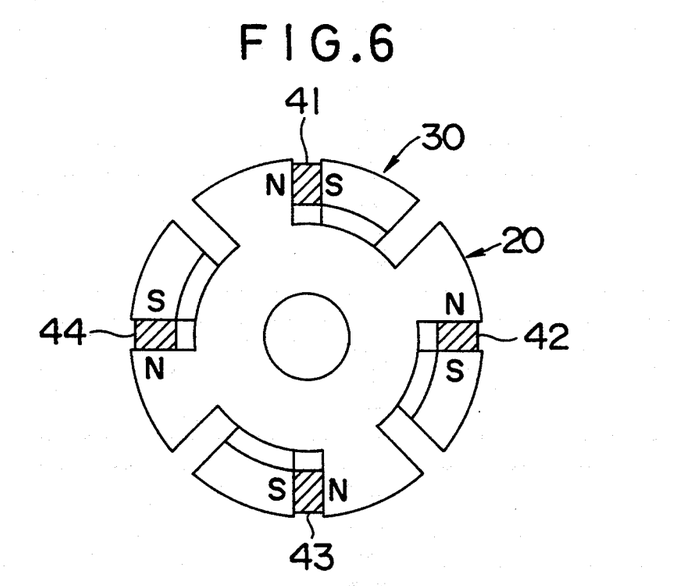
FIG. 6 is a transverse sectional view of a mover, showing a modification of the mounting construction of mover permanent magnet.

FIG. 6 shows a modification of the mover. This figure shows the mounting construction of the permanent magnets disposed on the magnetic pole core 20 and 30 of the mover 2. The magnetic pole blocks of the magnetic cores 20 and 30 which adjoin each other are magnetized to different polarity by the permanent magnets 41, 42, 43, and 44 magnetized in the same direction along the circumference. Two positional relationships are possible between the mover 2 having the configuration shown in FIG. 6 and the aforesaid stator 1: there are a relationship such that the permanent magnets 41, 42, 43, and 44 are opposed to the center of the stator salient poles and a relationship such that the permanent magnets 41, 42, 43, and 44 are opposed to stator winding insertion inlet.

Figure 7A:
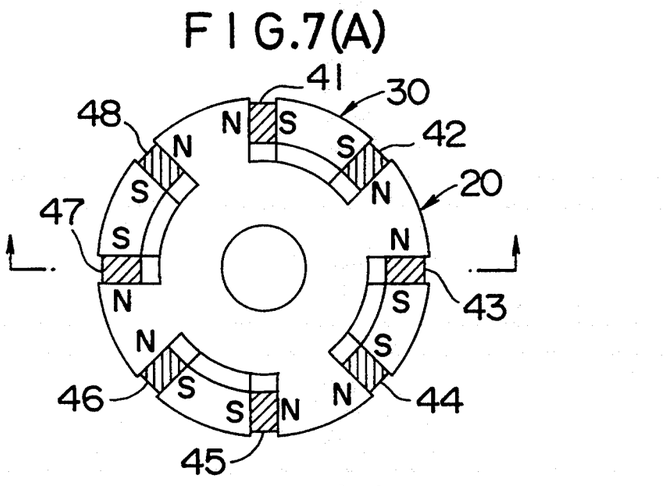
FIG. 7(A) is the transverse sectional view.
Figure 7B:
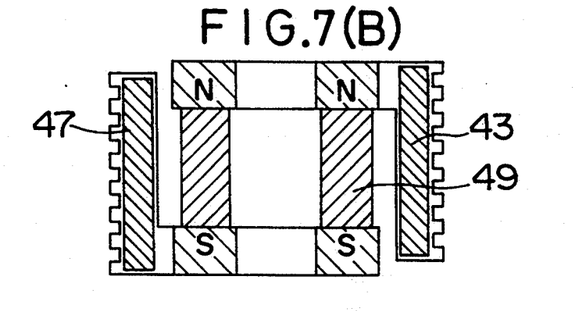
FIG. 7(B) is the longitudinal sectional view.

FIG. 7 shows another modification of the mover. This figure shows the mounting construction of the permanent magnets disposed on the magnetic pole cores 20 and 30 of the mover 2. As shown in FIG. 7, the permanent magnets 41 through 48 disposed between the magnetic pole blocks of the magnetic pole cores 20 and 30 are disposed so that the directions of magnetization of adjacent permanent magnets are opposite to each other. Further, a ring-shaped permanent magnet 49, which is magnetized in the axial direction, is disposed between the magnetic pole cores 20 and 30. By disposing permanent magnets in such a manner, the magnetic flux density of the magnetic pole surface can be increased.

Figure 8:
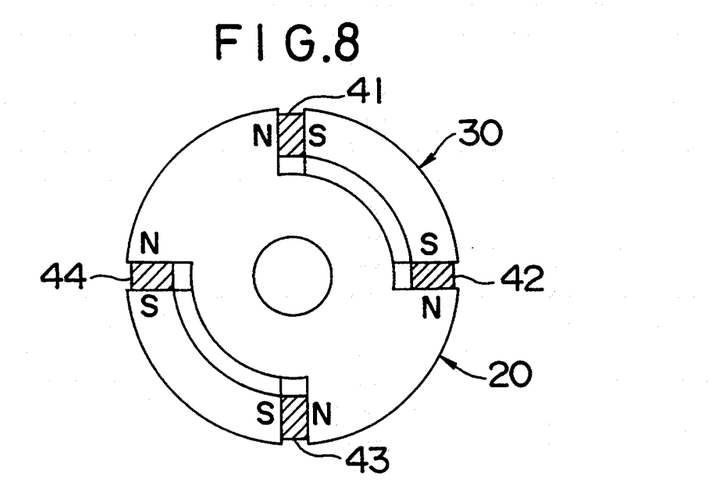
FIG. 8 is a transverse sectional view of a mover, showing still another modification of the mounting construction of mover permanent magnet.

FIG. 8 shows still another modification of the mover. This figure shows an example of configuration in which the number of magnetic pole blocks is halved as compared with the case shown in FIG. 6. The permanent magnets 41 through 44 disposed between the magnetic pole blocks of the magnetic pole cores 20 and 30 are disposed so that the directions of magnetization of the adjacent permanent magnets are opposite to each other. The mover and the stator are placed in a positional relationship such that the permanent magnets 41, 42, 43, and 44 are opposed to the center of the stator salient poles.

Figure 9:
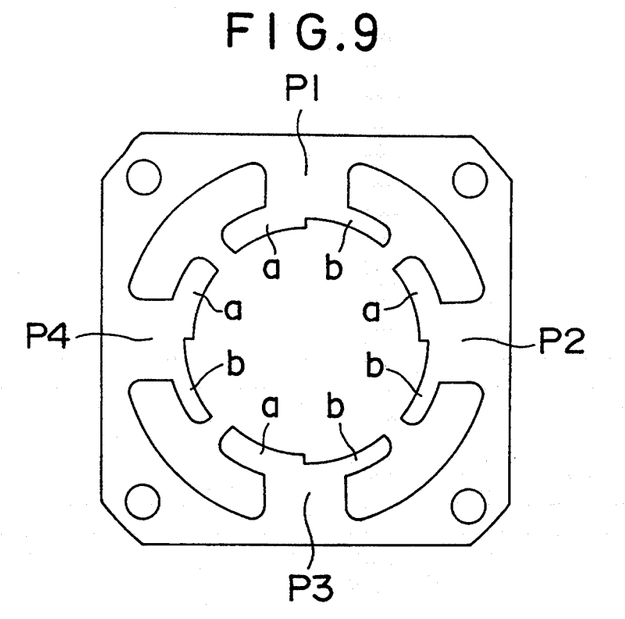
FIG. 9 is a plan view showing a modification of stator iron plate which forms a stator core.

FIG. 9 is a modification of the stator iron plate different from that shown in FIG. 3. In this case, the values of positive integer k and the number of phases m are k=1 and m=2, respectively. The salient pole tip of the salient pole P1, P2, P3, and P4 comprises the portion a which has a smaller inside radius and the portion b which has a larger inside radius with the center of salient pole being the boundary between the two portions.

Figure 10:
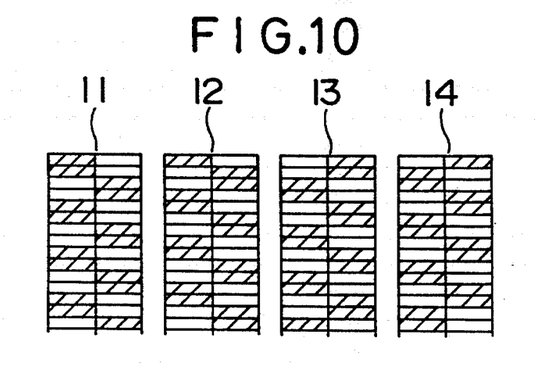
FIG. 10 is a development elevation, viewed from the mover side, of the stator tooth portion which is formed when the stator iron plates of FIG. 9 are laminated by rotating a predetermined angle each.

FIG. 10 is a development elevation, viewed from the mover side, of the tooth portion of the salient poles 11, 12, 13, and 14 of the stator core 10, which is formed when the stator iron plates are laminated by rotating an angle of $\theta = 90°$ each. The black portion (hatched portion) indicates the tooth top a, while the white portion (non-hatched portion) indicates the tooth bottom b. If the thickness of the rotator iron plate is taken as $t_0$, the teeth of a tooth pitch of 2·k·m·$t_0$, namely, 4·$t_0$ (k=1, m=2) and a tooth thickness of m·$t_0$, namely, 2·$t_0$ are formed on each salient pole by rotation laminating. When the left-side tooth portion of the salient pole 11 is taken as the reference, the left-side tooth portion of the salient pole 12 shifts by 1/(2·m), namely, ¼ of the tooth pitch, the left-side tooth portion of the salient pole 13 shifts by 2/(2·m), namely, 2/4 of the tooth pitch, and the left-side tooth portion of the salient pole 14 shifts by 3/(2·m), namely, ¾ of the tooth pitch. The right-side tooth portion of each of salient poles 11 through 14 shifts by ½ of the tooth pitch in the axial direction with respect to the left-side tooth portion.

Thus, a two-phase hybrid type linear pulse motor can be configured by locating the mover, which is combined with the stator core, at a position such that the teeth of the magnetic pole blocks disposed on the mover coincide with the teeth of the stator in the axial direction.

The angle $\theta$ of the rotation laminating of the stator iron plate is calculated by $\{(360 \cdot n) / (2 \cdot k \cdot m)\}$ degrees (where, m is the number of phases, k is an integer of 1 or more, n is 1 or 2pm±1 or 2km−1, in which p is an integer satisfying $1 \leq p < k$).

Next, the second embodiment of the present invention will be described with reference to FIGS. 11 through 13.

Figure 11:
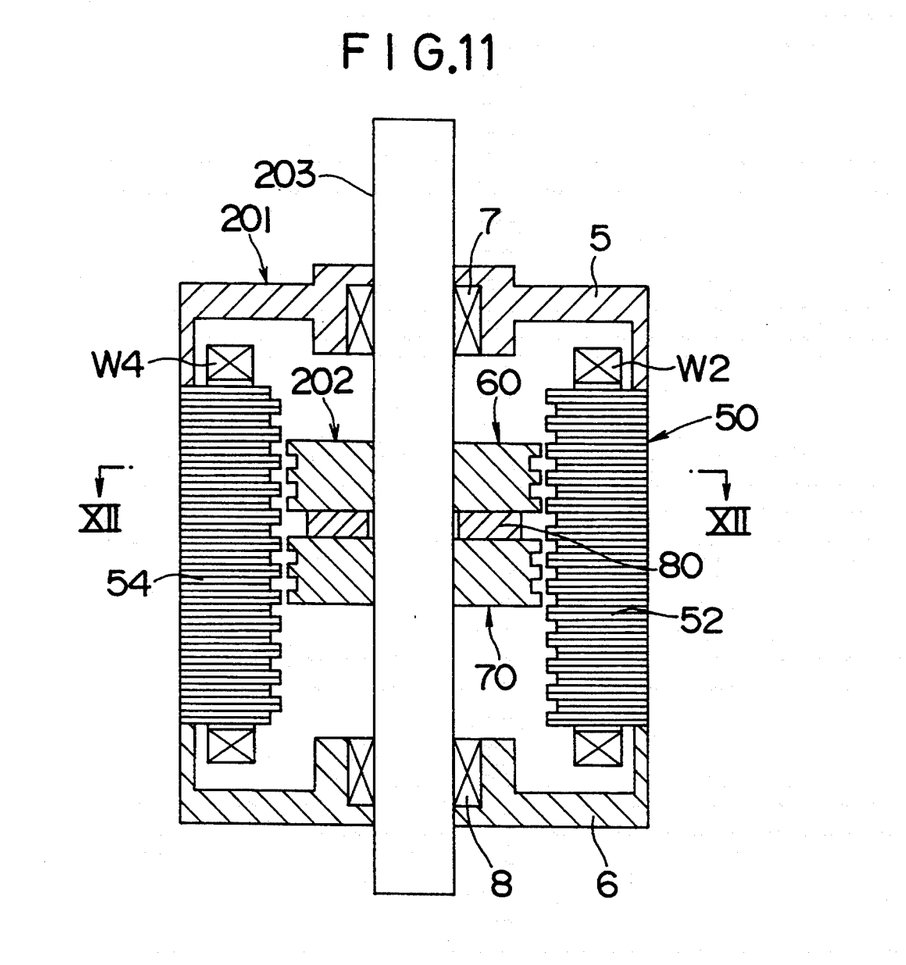
FIG. 11 is a longitudinal sectional view of the second embodiment of the linear pulse motor in accordance with the present invention.
Figure 12:
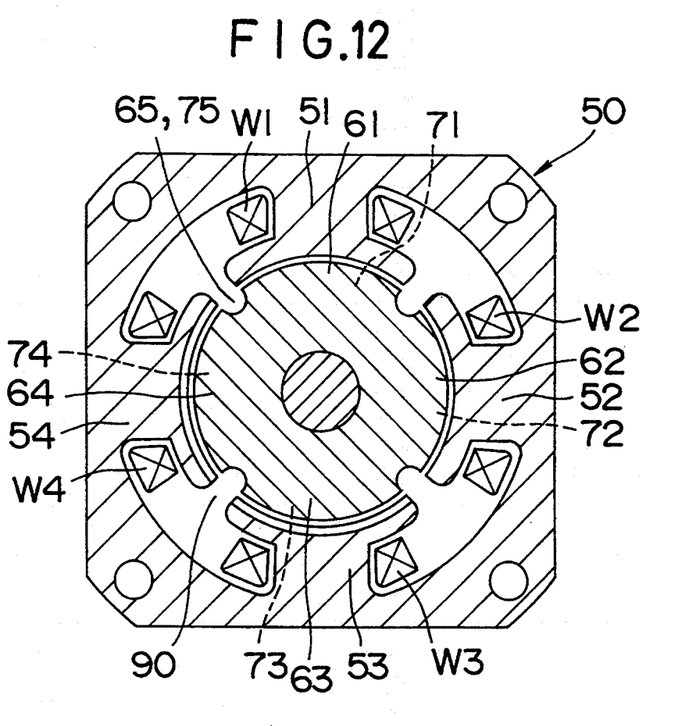
FIG. 12 is a transverse sectional view taken along the line XII—XII of FIG. 11.

FIG. 11 is a longitudinal sectional view of the linear pulse motor of the above-described configuration (2) in accordance with the present invention, and FIG. 12 is a transverse sectional view of the linear pulse motor taken along the line XII—XII of FIG. 11. In this case, the values of positive integer k and the number of phases m are k=1 and m=2, respectively; therefore, the number of stator salient poles is 2·k·m=4.

The construction of the stator core 50 which composes the stator 201 is the same as that of the stator core 10 of the first embodiment described above, which is shown in FIGS. 1 and 2. As with the first embodiment, the stator core 10 is supported by brackets 5 and 6 by fixing with screws (not shown) or the like. Therefore, neither a frame for the motor nor a motor casing is required.

On the other hand, a mover 202 located in the stator 201, together with a shaft 203 thereof, is supported by the brackets 5 and 6 via bearings 7 and 8 so that it can move in the axial direction. The mover 202 is provided with two mover cores 60 and 70 having a plurality of substantially ring-shaped teeth in the axial direction and a permanent magnet 80 which is put between the mover cores 60 and 70 and magnetized in the axial direction. The mover cores 60 and 70 are magnetized to different polarity from each other by the permanent magnet 80. The length in the axial direction of the permanent magnet 80 is set such that between the teeth disposed on the mover 60 and 70, when the tooth tops of teeth on one mover core are opposed to the tooth tops of the stator teeth, the tooth tops of teeth on the other mover core are opposed to the tooth bottoms of the stator teeth. In other words, when N is a positive integer, the distance between the teeth on mover cores disposed adjacently with the permanent magnet being interposed is set to be (N+0.5) times the tooth pitch of the teeth.

As described in the first embodiment, for the stator teeth disposed on each of stator salient poles, when the salient pole 51 is taken as the reference, the teeth of the salient pole 52 shifts by ¼ of the tooth pitch, the teeth of the salient pole 53 shifts by 2/4 of the tooth pitch, and the teeth of the salient pole 54 shifts by ¾ of the tooth pitch. Therefore, one phase is formed by performing wiring so that the phase around which winding W1 is wound is A phase, and the phase around which winding W3 is wound is inverse A phase (inverse phase of A), while the other phase is formed by performing wiring so that the phase around which winding W2 is wound is B phase, and the phase around which winding W4 is wound is inverse B phase (inverse phase of B), by which a two-phase hybrid type linear pulse motor can be configured. In this case, the basic traveling amount for each step is ¼ of the tooth pitch.

Grooves 65 and 75 in FIG. 12 are disposed in the axial direction on the surface of each of mover cores 60 and 70. The width of the groove 65 and 75 is almost the same as the width of the winding insertion inlet 90 of the stator core 50. By opposing the grooves 65 and 75 to the winding insertion inlet 90, the rotation of mover in the peripheral direction can be restrained by magnetic attraction. Therefore, the grooves are not always required for operation.

Figure 13:
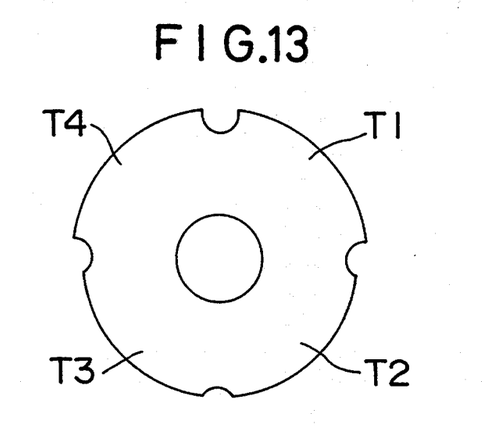
FIG. 13 is a view showing a modification of mover iron plate which forms a mover core.

FIG. 13 shows a modification of mover iron plate which composes the mover core. In this modification, the values of positive integer k and the number of phases m are k=1 and m=2, respectively; therefore, the number of stator salient poles is 2·k·m=4. In this case, ring-shaped teeth, which are cut by the winding insertion inlet, are disposed in the axial direction on the inner peripheral surface of the stator core 50 opposing to the mover. The motor is configured so that there is no shift of teeth in the axial direction on each stator salient pole.

In FIG. 13, the tooth portions T1 and T4 of the mover iron plate are portions having a larger outside radius (portions having larger tooth height), constituting the tooth top portions of the mover cores 60 and 70. On the other hand, the tooth portions T2 and T3 are portions having a smaller outside radius (portions having smaller tooth height), constituting the tooth bottom portions of the mover cores 60 and 70. The mover cores 60 and 70 are formed by laminating the mover iron plates while rotating $\theta=90$ degrees each. In this case, the outside radius of the tooth portions T2 and T3 can be the same as the bottom of the grooves 65 and 75. That is to say, the tooth height of the tooth portions T2 and T3 having smaller tooth height is zero.

When the tooth portions 61 and 71 of the mover cores 60 and 70 which are opposed to the salient pole 51 are taken as the reference, the tooth portions 62 and 72 of the mover cores which are opposed to the salient pole 52 shift by ¼ of the tooth pitch, the tooth portions 63 and 73 of the mover cores which are opposed to the salient pole 53 shift by 2/4 of the tooth pitch, and the tooth portions 64 and 74 of the mover cores which are opposed to the salient pole 54 shift by ¾ of the tooth pitch. By setting the distance between the teeth on mover cores disposed adjacently with the permanent magnet being interposed to be (N+0.5) times (N is a positive integer) the tooth pitch of the teeth, the teeth disposed on the mover cores 60 and 70 shift by ½ of the tooth pitch when the teeth disposed on the stator core is taken as the reference.

Therefore, a two-phase hybrid type linear pulse motor can be configured as with the first embodiment.

In this modification of the mover iron plate, there is no need for rotation laminating the stator iron plates of the stator core. Instead, the tooth portion can be formed by alternately laminating a predetermined number of laminated stator iron plates with larger inside diameter and stator iron plates with smaller inside diameter, or by machining teeth on the stator core after the stator core is formed with no teeth being disposed.

I claim:

1. A linear pulse motor comprising a stator including a stator core having a plurality of salient poles disposed radially on the inner side and having a plurality of teeth disposed axially on the inner peripheral surface of said salient poles and a stator winding wound around each of said salient poles; and a mover which is supported in said stator so as to move in the axial direction, wherein said mover has a plurality of teeth in the axial direction on the outer peripheral surface opposing to the inner peripheral surface of said stator and includes a mover core having a plurality of magnetic pole blocks disposed in the peripheral direction and a permanent magnet for magnetizing said magnetic pole blocks to a predetermined magnetic polarity, two of said magnetic pole blocks are disposed in an opposing relationship with respect to each of said stator salient poles with a air-gap in the peripheral direction, respective two magnetic pole blocks described above are magnetized to different polarity from each other by said permanent magnet disposed in said mover core and when the tooth tops of one of said two magnetic pole blocks are opposed to the tooth tops of one salient pole of said stator, the tooth tops of the other magnetic pole block are opposed to the tooth bottoms of the salient pole of said stator.

2. A linear pulse motor according to claim 1 wherein. when k is a positive integer, and m is the number of phases, said stator core is formed by laminating stator iron plates each being rotated by a predetermined angle, said stator iron plate has salient poles whose number is 2·k·m, and the tip of said salient pole opposing to said mover is configured so that when viewed from the mover side, salient poles with a smaller inside radius whose number is m and salient poles with a larger inside radius whose number is m are arranged in that order to form a set, and the sets whose number is k present, and said magnetic pole blocks are disposed on said mover in such a manner that the teeth of the adjacent magnetic pole blocks are in a positional relationship such that they shift by ½ of the tooth pitch in the axial direction.

3. A linear pulse motor according to claim 1 wherein, when k is a positive integer, and m is the number of phases, said stator core is formed by laminating stator iron plates each being rotated by a predetermined angle, said stator iron plate has salient poles whose number is 2·k·m, and the tip of said salient pole opposing to said mover is configured by a portion with a smaller inside radius and a portion with a larger inside radius with the center of said salient pole being the boundary, when said salient poles of said stator iron plate are viewed from the side of said mover, salient poles with the left half portion having a smaller inside radius and the right half portion having a larger inside radius whose number is m and salient poles with the right half portion having a smaller inside radius and the left half portion having a larger inside radius whose number is m are arranged in that order to form a set, and the sets whose number is k present, the teeth disposed on all magnetic pole blocks for said magnetic pole block disposed on said mover are in a positional relationship such that they are opposed to each other.

4. A linear pulse motor according to claim 1 wherein, said mover core has two magnetic pole cores, each of said magnetic pole cores has said magnetic pole blocks whose number is the same as the number of said stator salient poles, said magnetic pole blocks are integrally formed via a disc-shaped yoke portion at the axial end of said magnetic pole core, two of said magnetic pole cores are combined in an opposing relationship so that said magnetic pole blocks disposed on each of them are arranged alternately in the peripheral direction, and a permanent magnet magnetized in the axial direction is put between said two magnetic pole cores.

5. A linear pulse motor according to claim 1 wherein, said mover core has two magnetic pole cores, each of said magnetic pole cores has said magnetic pole blocks whose number is the same as the number of said stator salient poles, said magnetic pole blocks are integrally formed via a disc-shaped yoke portion at the axial end of said magnetic pole core, two of said magnetic pole cores are combined in an opposing relationship so that said magnetic pole blocks disposed on each of them are arranged alternately in the peripheral direction, and permanent magnets magnetized in the peripheral direction are put in gaps between two magnetic pole blocks which are in a positional relationship such that each magnetic pole block is opposed to one stator salient pole, among the gaps formed in the peripheral direction between said magnetic pole blocks.

6. A linear pulse motor according to claim (1) wherein, said mover core has two magnetic pole cores, each of said magnetic pole cores has said magnetic pole blocks whose number is the same as the number of said stator salient poles, said magnetic pole blocks are integrally formed via a disc-shaped yoke portion at the axial end of said magnetic pole core, two of said magnetic pole cores are combined in an opposing relationship so that said magnetic pole blocks disposed on each of them are arranged alternately in the peripheral direction, and permanent magnets magnetized in the peripheral direction are put in gaps between two magnetic pole blocks which are in a positional relationship such that each magnetic pole block is opposed to the adjacent stator salient pole, among the gaps formed in the peripheral direction between said magnetic pole blocks.

7. A linear pulse motor according to claim 1 wherein, said mover core has two magnetic pole cores, each of said magnetic pole cores has said magnetic pole blocks whose number is the same as the number of said stator salient poles, said magnetic pole blocks are integrally formed via a disc-shaped yoke portion at the axial end of said magnetic pole core, two of said magnetic pole cores are combined in an opposing relationship so that said magnetic pole blocks disposed on each of them are arranged alternately in the peripheral direction, permanent magnets magnetized in the peripheral direction are put in gaps formed in the peripheral direction between said magnetic pole blocks so that the direction of magnetization of adjacent ones of said permanent magnets is opposite to each other, and a ring-shaped permanent magnet magnetized in the axial direction is put between said two magnetic pole cores.

8. A linear pulse motor according to claim 1 wherein, said mover core has said magnetic pole blocks whose number is the same as the number of said stator salient poles, the adjacent ones of said magnetic pole blocks are magnetized to different polarity form each other, and each of said magnetic pole blocks is disposed so as to stride two adjacent stator salient poles in an opposing relationship.

9. A linear pulse motor according to claim (8) wherein, said mover core has two magnetic pole cores, each of said magnetic pole cores has said magnetic pole blocks whose number is a half the number of said stator salient poles, said magnetic pole blocks are integrally formed via a disc-shaped yoke portion at the axial end of said magnetic pole core, two of said magnetic pole cores are combined in an opposing relationship so that said magnetic pole blocks disposed on each of them are arranged alternately in the peripheral direction, and a permanent magnet magnetized in the axial direction is put between said two magnetic pole cores.

10. A linear pulse motor according to claim 8 wherein, permanent magnets magnetized in the peripheral direction are put in gaps formed in the peripheral direction between said magnetic pole blocks disposed in the peripheral direction, said permanent magnets are magnetized so that the direction of magnetization of adjacent ones of said permanent magnets is opposite to each other, and said magnetic pole blocks magnetized to the same polarity are integrally formed via a disc-shaped yoke portion at the axial end.

11. A linear pulse motor comprising a stator including a stator core having a plurality of salient poles disposed radially on the inner side and having a plurality of teeth disposed axially on the inner peripheral surface of said salient poles and a stator winding wound around each of said salient poles; and a mover which is supported in said stator so as to move in the axial direction, wherein said mover includes two mover cores having a plurality of teeth in the axial direction on the outer peripheral surface opposing to the inner peripheral surface of said stator and a permanent magnet which is put between said two mover cores and magnetized in the axial direction, said two mover cores are magnetized to different polarity from each other by said permanent magnet interposed between said mover cores, and when the tooth tops of the teeth on one core of said two mover cores are opposed to the tooth tops of a plurality of teeth disposed on each salient pole of said stator, the tooth bottoms of the teeth of the other mover core are opposed to said tooth tops of said stator salient pole.

12. A linear pulse motor according to claim 11 wherein, when k is a positive integer, and m is the number of phases, said stator core is formed by laminating stator iron plates each being rotated by a predetermined angle, said stator iron plate has salient poles whose number is 2·k·m, and the tip of said salient pole opposing to said mover is configured so that when viewed from the mover side, salient poles with a smaller inside radius whose number is m and salient poles with a larger inside radius whose number is m are arranged in that order to form a set, and the sets whose number is k present, and said mover core has substantially ring-shaped tooth portion disposed at equal intervals in the axial direction, and the distance between the teeth of adjacent mover cores between which said permanent magnet is interposed is (N+0.5) times (N is a positive integer) the tooth pitch.

13. A linear pulse motor according to claim 12 wherein, when k is a positive integer, and m is the number of phases, axial grooves whose number is 2·k·m are disposed at equal intervals in the circumferential direction on the surface of said mover core, and the width of the groove is almost the same as the width of the winding insertion inlet of the stator core, and the grooves are opposed to the winding insertion inlets.

14. A linear pulse motor according to claim 11 wherein, when k is a positive integer, and m is the number of phases, ring-shaped teeth cut by a winding insertion inlet are disposed at equal intervals in the axial direction on the inner peripheral surface of said stator core opposing to said mover, said stator core is formed by laminating stator iron plates each being rotated by a predetermined angle, when said stator core has salient poles whose number is 2·k·m, said mover iron plate has teeth whose number is 2·k·m, and when the configuration of tooth portion is viewed from the side of said stator, the tooth portion having a larger tooth height whose number is m and the tooth portion having a smaller tooth height whose number is m are arranged in that order to form a set, and the sets whose number is k present, and the distance between the teeth of adjacent mover cores between which said permanent magnet is interposed is (N+0.5) times (N is a positive integer) the tooth pitch.

15. A linear pulse motor according to claim 14 wherein the tooth height of the tooth portion with a smaller tooth height is zero.

* * * * *